Figure 1:
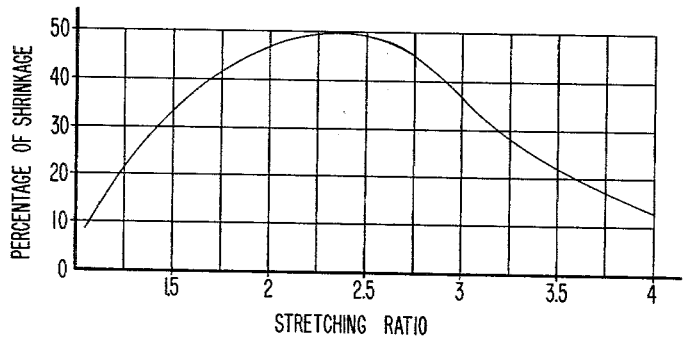

INVENTORS
WALTER F. SEIFRIED
OLAF MÜLLER

United States Patent Office 3,187,075
Patented June 1, 1965

3,187,075
PROCESS FOR THE MANUFACTURE OF SHRINKABLE POLYTEREPHTHALIC ACID GLYCOL ESTER FILMS
Walter Seifried and Olaf Müller, Wiesbaden-Biebrich, Germany, assignors to Kalle Aktiengesellschaft, Wiesbaden-Biebrich, Germany, a corporation of Germany
Filed May 26, 1961, Ser. No. 115,591
Claims priority, application Germany, May 28, 1960, K 40,843
1 Claim. (Cl. 264—289)

The present invention is concerned with a process for the manufacture of polyterephthalic acid glycol ester films. More particularly, it is concerned with a process for the manufacture of polyterephthalic acid glycol ester films which are capable of shrinking in both directions and may be used for packaging.

It is well known to package foodstuffs and other articles in plastics films. While bodies having flat surfaces can be smoothly wrapped in films without difficulty, it takes special precautions to avoid wrinkling if bodies of irregular shape are to be packed. This drawback has been eliminated by the use of shrinkable films which are caused to shrink on the goods to be packed.

Thermoplastic film material will extend if subjected to tensile stress, a distinct extension resulting from a distinct tensile stress at a given temperature. If the extension is maintained while the temperature is sufficiently lowered, the state of increased stress is set. However, the stress decreases and the thermoplastic film contracts, i.e., shrinks, when it is again heated to the temperature of stretching or higher. Yet the initial state can be attained only with very few thermoplastics, a certain longitudinal stretch remaining permanently in most cases. If plastics films are set by cooling them after stretching in two directions which are at right angles to each other, films are obtained which are capable of shrinking in both directions.

If foodstuffs are to be packaged it is essential that the temperature required for shrinking lie under 100° C. so that shrinking can be performed by immersion in hot water. For packing products of varying and irregular shape the film should preferably have a minimum shrinking capacity of 30% above all vertically of the direction of the film web.

The shrinkable films hitherto known contain plasticizers, stabilizers or slipping agents. They are, therefore, unsuited for many purposes, in particular for packaging foodstuffs, as in many cases it cannot be attained that, or is even impossible to predict whether these additives will remain within the film or will migrate to the packed goods.

Now, the present invention is concerned with a process for the manufacture of plastics films which, when heated to not more than 100° C., will shrink for at least 30% in both directions and which are free of components which are able to migrate off the plastic. In accordance with the present invention, a film of this kind is produced by first stretching in one direction a polyterephthalic acid glycol ester film heated to a temperature ranging from 80 to 95° C., the ratio of extension being from 1:2 to 1:3, cooling it, and then stretching it in a direction which is substantially vertical to the direction of the first stretching operation, the temperature applied being not higher than that applied during the first stretching, and the ratio of extension being at least 1:1.5, and finally cooling the film.

Suitably, an amorphous pre-film is used as the starting material for the process according to the present invention. The film should advantageously be stretched first in the transverse direction, using, e.g., a stretching frame of known type. The second stretching is performed preferably at temperatures which are from 3 to 8° C. below the temperature applied during the first stretching. The longitudinal stretching is performed in known manner by means of two systems of rolls having different speeds of rotation. In general, the ratio at which the film is stretched in the second stretching operation should not exceed 1:4, because the film tends to tear at higher stretching ratios. In any case, stretching ratios over 1:5 are inappropriate.

The polyterephthalic acid glycol esters to be used in accordance with the present invention for the preparation of the films contain mainly ethylene glycol as the glycol component in the polymer chain. If they are commercial products, they will further contain, unintentionally in most cases, small amounts of other glycol components, e.g., a few percent of diethylene glycol. It is also possible to have intentionally replaced part of the ethylene glycol in the polymer chain by other glycols, but in any case the amount of ethylene glycol present in the films to be used according to this invention should by far exceed that of other glycol components.

The drawing attached hereto illustrates the influence of certain conditions of manufacture on the shrinking capacity of the films prepared in accordance with the present invention.

Figure 2:
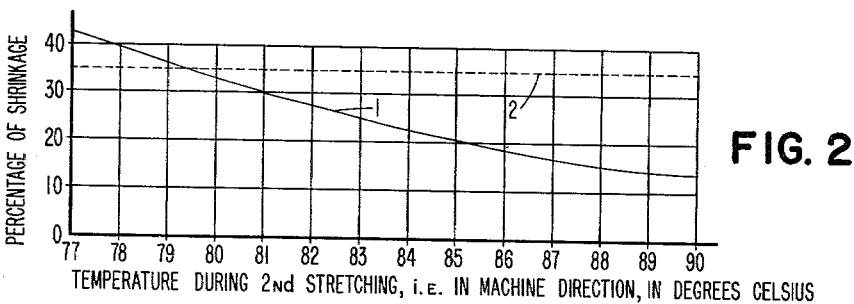
Figure 3:
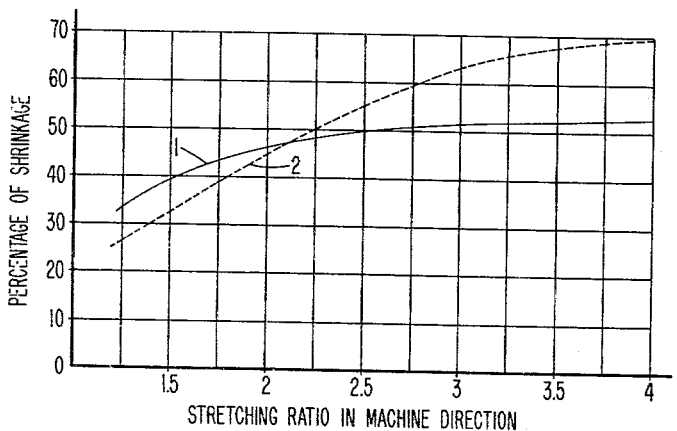

FIGURE 1 shows the transverse shrinking of a film (in percent) as a function of the stretching ratio, FIGURE 2 shows the transverse shrinking of a film in percent (curve 1) and its shrinking in the direction of the film web (curve 2) as a function of the temperature applied during the second stretching operation, and FIGURE 3 shows the transverse shrinking of a film in percent (curve 1) and its shrinking in the direction of the film web (curve 2) as a function of the stretching ratio applied during the stretching operation in the direction of the film web, i.e., the machine direction.

FIG. 1 shows the transverse shrinking of a film (in percent) as a function of the stretching ratio, i.e. of the ratio of the width of the pre-film to the width of the film after stretching. The film was stretched at a temperature of 85° C., then cooled while being kept in the stretched state, and subsequently its contraction at 90° C., was determined. The term "contraction" is meant to designate the reduction in length after shrinking measured in percentages of the initial length of the stretched film. It is evident from FIG. 1 that stretching ratios between 1:1.5 and 1:3 induce satisfactory shrinking capacities. Stretching rates of over 1:2 are preferred because of better output.

FIGURE 2 shows the transverse shrinking of a film in percent (curve 1) and its shrinking in the direction of the film web (curve 2) as a function of the temperature applied during the second stretching operation. Transverse stretching was performed at 85° C., at a stretching ratio of 1:2.8. As shown in FIGURE 2, the shrinking capacity in the direction of the first stretch, which in this case is in the transverse direction, is advantageous, i.e., at least 30 percent, if the second stretch is performed some degrees Celsius (° C.) below that temperature at which the first stretch was performed.

FIGURE 3 shows the transverse shrinking of a film in percent (curve 1) and its shrinking in the direction of the film web (curve 2) as a function of the stretching ratio applied during the stretching operation in the direction of the film web, i.e., in the machine direction. Transverse stretching was performed at 85° C., at a stretching ratio of 1:2.8; stretching in the longitudinal or machine direction was performed at 79° C. It is shown by the curves that, beginning with a stretching ratio of about 1:1.5 in the longitudinal or machine direction, a satisfactory shrinking capacity in this direction was obtained.

It has proved to be of advantage to submit the biaxially stretched film, subsequently to its stretching, to a short heating process at temperatures ranging from the highest temperature applied during stretching to the temperature at which shrinking shall be performed later on, while the film is prevented from shrinking by suitable fixtures. By this heating process, a balance of tensions is obtained and the film is caused to lie more plane. The fixtures are removed only after the film has cooled.

For better slip of the films, slipping agents that are harmless from a physiological point of view, e.g., starch, may be advantageously applied before the film is wound up or further processed.

It will be obvious to those skilled in the art that many modifications may be made within the scope of the present invention without departing from the spirit thereof, and the invention includes all such modifications.

What is claimed is:

A process for biaxially stretching polyterephthalic acid glycol ester film to form a heat-shrinkable film which comprises stretching a previously formed unoriented film in a first direction at a temperature ranging from 80 to 95° C. to 2 to 3 times its original dimension in said first direction, cooling the film, stretching it in a second direction which is substantially perpendicular to said first direction to 1.5 to 5 times its original dimension in said second direction, at a temperature which is 3 to 8° C. below the temperature of stretching in the first direction, and cooling the film.

References Cited by the Examiner

UNITED STATES PATENTS 2,928,132   3/60   Richards _____ 18—48

OTHER REFERENCES

Dewey and Almy Chemical Co., Bulletin Ci, "Cry-o-Vac Protection for Poultry," received July 1, 1940 (15 pages).

ROBERT F. WHITE, *Primary Examiner.*

WILLIAM J. STEPHENSON, MICHAEL V. BRINDISI, ALEXANDER H. BRODMERKEL, *Examiners.*